Patented June 5, 1951

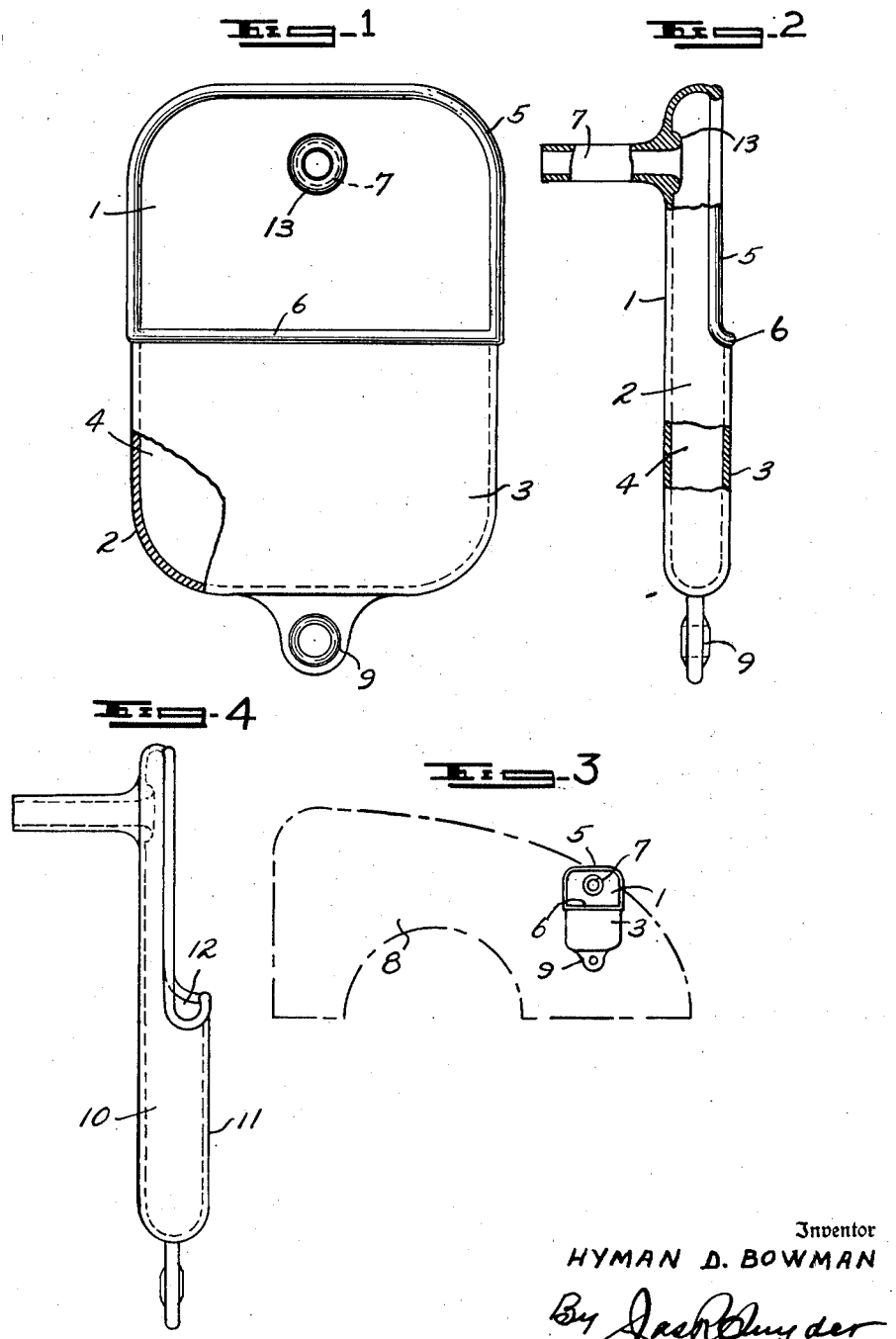

2,555,868

UNITED STATES PATENT OFFICE 2,555,868

DRIP TRAY

Hyman D. Bowman, Raleigh, N. C.

Application March 24, 1949, Serial No. 83,120

3 Claims. (Cl. 226—129)

This invention relates to an improved drip tray, and while primarily designed and intended for use in protecting the finish of an automobile fender or adjacent parts from drippings or possible overflow of gasoline when gasoline is being run into the fuel tank of the vehicle, it will be obvious that the device may be employed for any other purposes wherein it is found to be applicable.

Important objects and advantages of the invention are to provide a drip tray of the character described, which will receive and collect all drippings and overflow of gasoline while placing the latter in the tank of the vehicle, which functions to automatically conform to the contour of any surface upon which it is positioned, which is adaptable for use in connection with any type of gasoline tank inlet regardless of the position of the latter, which is simple in its construction and arrangement, durable and efficient in its use, compact, and comparatively economical in its manufacture.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a front elevational view of a drip tray constructed in accordance with the invention.

Figure 2 is a side elevational view thereof, partly in cross section.

Figure 3 illustrates the adaptation of the drip tray to the fender of a motor vehicle.

Figure 4 is a side elevational view of a modified form of the device embodying the invention.

Referring in detail to the drawing, the improved drip tray generally comprises an oblong, rectangularly-shaped structure, preferably an integral unitary structure constructed of fairly flexible rubber, or any other suitable analogous material, and preferably having rounded corners.

The device comprises a back wall 1 entirely surrounded by an integrally formed, forwardly projecting side wall 2. A front wall 3, integrally formed with the forward edges of the side wall, covers approximately the lower one-half portion of the back wall, whereby the upper portion of the tray has an open front, and the lower portion thereof is formed with a pocket 4.

The front free edge of the open upper portion of the side wall 2 is provided with an integrally formed reenforcing bead 5. The upper free edge of the front wall 3 is likewise provided with an integrally formed reenforcing bead 6, the ends of which latter merge with the respective lower ends of the bead 5.

The obvious function of the reenforcing beads 5 and 6 generally is to uphold the structure in its tray formation. Without such reenforcing beads and due to the flexibility of the structure, the side wall 2 and the front wall 3 would normally tend to collapse by their own weight toward the back wall 1. The bead 5 serves to maintain the engaged upper portion of the side wall in its forwardly projecting position, while the bead 6 acts to maintain the upper end of the pocket 4 in the open position.

A tubular spout 7 is communicably joined with the back wall 1 and projects rearwardly from the latter. The spout is disposed at the center of the back wall adjacent to the upper end of the latter. The spout is provided for insertion into the inlet hole of a fuel tank, and is flexible to render same adaptable for engaging in such inlet hole regardless of the position of the latter in the fender or other parts of the motor vehicle. The connected end of the spout is formed with a seating taper, and with a forwardly projecting annular ridge 13.

In practice, the device is ordinarily suspended from the fuel tank inlet hole, usually in the fender 8, by the insertion of the spout 7 in said inlet hole, and rest against the fender, as shown in Figure 3, with the pocket 4, of course, being disposed downwardly. To flow gasoline into the fuel tank the nozzle of the gasoline supply hose, is inserted into the spout 7 and remains in the latter while gasoline is being run into the fuel tank. When the said nozzle is withdrawn from the spout 7, upon completion of the gasoline supplying operation, all drippings therefrom will fall into the upper open portion of the tray and will be collected by gravity flow in the pocket 4. In case of the overflow of the gasoline, such overflow will in like manner be directed by gravity flow into the pocket 4. An apertured suspension tab 9 depends from the lower end of the device, and is adapted for hanging the tray in the upside-down position for draining all fluid from the pocket 4 when required.

The modified form of device, shown in Figure 4, differs from the embodiment of the invention above described, only in that the side wall 10, at one upper end of the front wall 11, is formed with a pouring recess 12 to facilitate the removal of any collected fluid from the pocket by concentrating the flow of the fluid from the latter.

The present invention provides a most efficient device of its kind, which may be economically constructed, and conveniently and successfully employed for fully protecting any surfaces upon which it is positioned from damage due to fluid drippings or overflow in the manner herein set forth.

What I claim is:

1. An integrally formed drip tray constructed of flexible material for a fuel tank, comprising a back wall, a side wall surrounding and joined with said back wall, a front wall joined with the lower portion of said side wall and forming a pocket having an open upper end, a flexible tubular spout of considerable length for insertion into the tank joined with the upper portion of said back wall and projecting rearwardly from the latter, and reenforcing means formed at the free edges of said side wall and at the free upper edge of said front wall.

2. An integrally formed drip tray constructed of flexible material for a fuel tank, comprising the combination of an oblong rectangularly-shaped back wall, a side wall surrounding and joined with said back wall, a front wall joined with the lower portion of said side wall and forming a pocket having an open upper end, a tubular flexible spout of considerable length for insertion into the tank having a tapering connection with the upper portion of said back wall and projecting rearwardly from the latter, a reenforcing bead formed at the free forwardly disposed edge of said side wall, and a reenforcing bead formed at the free upper edge of said front wall.

3. An integrally formed drip tray constructed of rubber for a fuel tank, comprising the combination of an oblong rectangularly-shaped back wall, a side wall surrounding said back wall and projecting forwardly from the latter, a front wall joined with the lower portion of said side wall and forming a pocket having an open upper end, a tubular spout of considerable length for insertion into the tank having a tapering connection with the upper portion of said back wall and projecting rearwardly from the latter, a reenforcing element formed at the free forwardly disposed edge of said side wall, a reenforcing element formed at the free upper edge of said front wall, and a suspension tab depending from the lower end of said side wall, said side wall being provided with a pouring recess disposed at one end of the upper edge of said front wall.

HYMAN D. BOWMAN.

REFERENCES CITED

The following references are of record in the file of this patent:

UNITED STATES PATENTS

| Number | Name | Date |
|---|---|---|
| 581,977 | Clingman | May 4, 1897 |
| 636,462 | Small | Nov. 7, 1899 |
| 704,206 | Newlin | July 8, 1902 |
| 2,111,031 | Newton | Mar. 15, 1938 |

FOREIGN PATENTS

| Number | Country | Date |
|---|---|---|
| 297,631 | Great Britain | Sept. 27, 1928 |